United States Patent [19]

Doumit

[11] 4,439,339
[45] Mar. 27, 1984

[54] DESCALER COMPOSITION AND METHOD

[76] Inventor: Carl J. Doumit, 703 Hemlock St., Columbus, Miss. 39701

[21] Appl. No.: 464,943

[22] Filed: Feb. 8, 1983

[51] Int. Cl.$^3$ .............................................. C02F 5/08
[52] U.S. Cl. ...................................... 252/80; 252/81; 252/82; 252/142; 252/143; 252/175; 252/178; 252/180; 134/3; 134/41; 134/22.19
[58] Field of Search ..................... 252/80, 81, 82, 142, 252/143, 175, 178, 180; 134/3, 41, 22.19

[56] References Cited

U.S. PATENT DOCUMENTS

| | | | |
|---|---|---|---|
| 1,548,495 | 8/1925 | Buhler | 252/143 |
| 1,742,347 | 1/1930 | Fries | 252/143 |
| 3,607,398 | 9/1971 | Lucas | 134/3 |
| 4,199,469 | 4/1980 | Walzer | 252/80 |
| 4,246,130 | 1/1981 | Koch | 252/143 |

*Primary Examiner*—John E. Kittle
*Assistant Examiner*—Hoa Van Le
*Attorney, Agent, or Firm*—LeBlanc, Nolan, Shur & Nies

[57] ABSTRACT

An aqueous acidizer composition and method of utilizing same in the removal of scale from fresh water production equipment such as desalinators or evaporators (watermakers) and distillation units as well as heat exchangers and boilers. The composition contains a blend of three acids of varying strengths carefully selected to provide a timed release effect. The acids which are employed include hydrochloric acid, dichloroacetic acid and acetic acid. The composition further contains a surfactant such as isopropyl alcohol which provides surfactant properties and also reacts with the acids, resulting in multiple equilibria in which the corresponding esters are formed. The composition also includes an acid-base indicator such as methyl orange to signify neutralization of the acidizer during use in scale removal. The present composition is particularly effective in removal of phosphate and carbonate scale as well as some sulfate scale. Other deposits containing basic anions are also removed.

6 Claims, No Drawings

DESCALER COMPOSITION AND METHOD

BACKGROUND AND SUMMARY OF THE INVENTION

The present invention relates to an aqueous acidizer composition and the use of the composition in the removal of scale from fresh water production equipment. More particularly, the present invention relates to an acidizer composition containing a blend of three acids of varying strengths, with each component of the composition being carefully selected to provide a timed release effect so as to prolong the activity of the composition in scale removal over an extended period of time while simultaneously minimizing pitting and fatigue of the metallic equipment or its components.

Various compositions for use in water treatment or the removal of scale from water storage and transfer equipment as well as cooling towers, boilers and some types of fresh water production equipment, include the compositions as described in the following U.S. Pat. No. 3,235,324 to Merriman; U.S. Pat. No. 3,335,085 to Hronas; U.S. Pat. No. 3,424,688 to Boiko et al; U.S. Pat. No. 3,458,354 to Reich; U.S. Pat. No. 3,969,255 to Connelly; U.S. Pat. No. 4,199,469 to Walzer; and U.S. Pat. No. 4,222,886 to Connelly. Various of these patents disclose the use of hydrochloric acid along with additional components and, in particular, U.S. Pat. No. 4,199,469 discloses the use of hydrochloric acid along with isopropyl alcohol and additional acid components. The use of isopropyl alcohol has been restricted to its ability to kill microorganisms, remove bio-organic residues such as algae, and as a solvent for various organic components of formulations such as described in U.S. Pat. No. 3,335,085.

In the removal of scale from certain types of fresh water production equipment, sometimes referred to as "watermakers", strong mineral acids such as sulfuric, nitric and perchloric acids have been found to cause serious damage to the equipment. This is due to the fact that both the hydrogen ions and the oxidizing anions of these acids tend to cause severe metal pitting at the acid concentrations which are required for scale removal. In such treatment for scale removal, acid concentrations of at least 0.6 M are generally necessary. Although hydrochloric acid does not contain an oxidizing anion, the chloride ion in high concentration readily coordinates copper, nickel and other transition metal ions, thus increasing the probability of metal pitting. This effect coupled with the corrosive properties of hydrogen ions in high concentration prohibits the use of hydrochloric acid alone to descale watermakers. To be effective, a solution concentration in excess of 0.6 M is desirable.

The use of phosphoric acid to descale watermakers is not feasible. Not only is it a relatively weak acid, thus prolonging the time required for acidization, but also serious difficulties arise when using phosphoric acid in watermakers. Watermakers are primarily restricted to marine or related use in which water processed contains an extremely high level of calcium, magnesium, iron and other heavy metal ions which readily react with phosphoric acid to produce phosphate scales in these units. As there is always a residual amount of sea water in a watermaker during acidization, phosphoric acid creates a scale problem rather than alleviating one.

In the group of moderately strong inorganic acids which are conventionally employed in scale removal, sulfamic acid has previously been the most popular of such acids employed in the descaling of water production equipment. It has been found that sulfamic acid does indeed remove phosphate and carbonate scale without causing serious damage to the metal unit. The $K_a$ for sulfamic acid is equal to $1.03 \times 10^{-1}$. The use of sulfamic acid, however, has presented the following major disadvantages in the watermaker descaler process: (1) Sulfamic acid must be sold dry requiring "on site" mixing. This is very time consuming due to the relatively low solubility of the acid in water under ambient conditions. Aqueous solutions of the acid are unstable upon standing. Over a short period of time sulfamic acid in water hydrolyzes with the formation of $NH_4HSO_4$. This prohibits the marketing of the acidizer as an aqueous solution; (2) Because of the low solubility of sulfamic acid in water, successive acidizations and flushings of the watermaker are frequently necessary for complete scale removal. This again is quite time consuming; (3) With even moderate to low temperature fluctuations within the watermaker, sulfamic acid frequently precipitates out of solution during acidization, clogging the watermaker tube bundles and other very "difficult to clean" components; (4) Calcium, magnesium and other metal sulfamate salts that are produced during the acidization process are quite water insoluble and thus precipitate within the watermaker tube bundles and other "difficult to clean" components. This poses a unit "clogging" problem similarly to point (3) above; (5) Sulfamic acid will cause some metal pitting of 90% copper-10% nickel alloy, and thus evaporator parts which are repeatedly exposed to the acid during descaling can experience considerable damage.

By the present invention, there is provided an improved composition for use in the removal of scale from fresh water production equipment. The composition of the present invention includes a blend of three acids of varying strengths carefully selected to provide an acidizer having a timed release effect. This timed release effect significantly enhances maximum scale removal with minimal or insignificant pitting of the metal evaporator or other equipment. The composition also contains a surfactant, preferably isopropyl alcohol, which taken together with its reaction products with the acid components, serves to accelerate the descaling process. An acid-base indicator and water also form a part of the present composition.

DESCRIPTION OF THE PREFERRED EMBODIMENTS

The composition of the present invention is in the form of an aqueous solution which, as initially formulated, contains the following components:

(1) Hydrochloric acid—2.6 to 3.4 M (about 9.5 to 12.4% by weight). The acid dissociation constant, $K_a$, for HCl is extremely large at 25° C.

(2) Dichloroacetic acid—0.4 to 0.8 M (about 5.2 to 10.3% by weight). $K_a = 3.32 \times 10^{-2}$ at 25° C.

(3) Acetic acid—3.6 to 4.5 M (about 21.6 to 27.4% by weight). $K_a = 1.80 \times 10^{-5}$ at 25° C.

(4) Surfactant—about 5 to 10% by weight.

(5) Acid-base indicator—about 0.00025 to 0.00035% by weight.

(6) Fresh water—about 40 to 60% by weight.

After formulating the composition containing the relative amounts of components as stated above, the composition should be diluted approximately eight-fold with fresh or sea water, e.g., one gallon of initial formulation to eight gallons of fresh or sea water, for use in descaling fresh water production equipment in accordance with the invention. The actual amount of the final diluted composition to be employed will of course depend upon the size of the equipment being treated.

In one embodiment, the composition of the invention was initially formulated as follows:
(1) Hydrochloric acid—3.0 M.
(2) Dichloroacetic acid—0.4 M.
(3) Acetic acid—3.75 M.
(4) Isopropanol—5% by weight.
(5) Methyl orange indicator—0.00026% by weight.
(6) Fresh water—40% by weight.

The timed release effect of the liquid descaler composition of the present invention is achieved as the hydrochloric acid in dilute concentration (0.325 M–0.425 M in use) dissolves both phosphate and carbonate scale as well as some sulfate scale while maintaining both the dichloroacetic acid and acetic acid protinated and unreactive initially. As the hydrochloric acid is neutralized, the dichloroacetic acid begins to deprotinate and to react with the phosphate and carbonate scale. Since the dichloroacetic acid is a stronger acid than acetic acid, the acetic acid will remain protinated. The acid concentrations are 0.05 M–0.1 M for dichloroacetic acid and 0.45 M–0.56 M for acetic acid within the watermaker. After 15 minutes of reaction at ambient temperature, virtually all of the hydrochloric and dichloroacetic acids will have been neutralized.

After the first 15 minutes of reaction, the evaporator solution temperature is elevated to 130° F. At this temperature, the acetic acid will begin to rapidly dissolve the carbonate scale. This occurs for several reasons: (a) The reaction rate increases because of an increase in entropy at the elevated temperature; (b) The acid dissociation constant for acetic acid becomes larger in a system of high ionic strength at elevated temperature; (c) At an elevated temperature, the reactant species can more readily attain the activation energy required for reaction; and (d) Collision frequencies of reactant species increase at elevated temperatures, facilitating reaction progress.

The net result of this procedure is the rapid neutralization and removal of carbonate scale by the acetic acid. Virtually all of the phosphate scale and some of the sulfate scale have been previously removed by the hydrochloric acid and dichloroacetic acid. The acetic acid reaction is allowed to proceed for 20 to 30 minutes. The watermaker is then drained and purged so as to remove the salts which have formed during the acidization process and also to remove traces of unreacted acids.

The surfactant component, which may be ispropyl alcohol or isobutyl alcohol, has a very significant role in the composition of the present invention. Not only do isopropyl alcohol and isobutyl alcohol have surfactant properties, but these alcohols can also react with organic and mineral acids during which multiple equilibria are established with the formation of corresponding esters. The esters, in turn, serve as additional surfactants having their own unique properties. For example, the following are typical equilibria involving the reaction of isopropyl alcohol with hydrochloric acid, dichloroacetic acid and acetic acid. Isopropyl alcohol will also hydrogen bond with water, thus establishing an equilibrium involving the hydrated free acid.

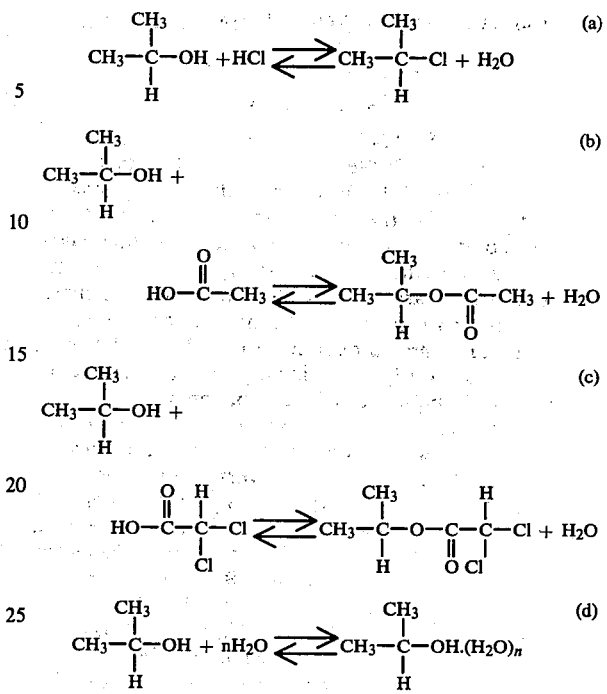

The free or hydrated alcohol plus its reaction products, in the form of esters, assist in removing organic residues included in the phosphate/carbonate scale and which originated in the volume of sea water desalinated in the watermaker. The removal of these inclusions makes the scale deposits more porous and this enhances the rate at which the scale reacts with the acid blend. Similar reactions will take place in the case of isobutyl alcohol. The amount of isopropyl alcohol which may be employed in the initial formulation is in the range of 5 to 10% by weight of the composition. When isobutyl alcohol is employed instead, the amount of this component is in the range of 5 to 8% by weight.

An acid-base indicator such as methyl orange is incorporated into the formulation as a means of indicating that the acidizer composition has been neutralized by the phosphate and carbonate scale. As the process of scale removal approaches completion, the solution in the watermaker will change color, from bright red to an amber color, in the presence of methyl orange, thus signifying the termination of the descaling process. Other acid-base indicators such as methyl yellow or bromocresol green may also be employed.

The water component of the present composition is significant in that it serves as a solvent for the other components of the composition. Of extreme importance is the fact that the metal salts of the hydrochloric acid, dichloroacetic acid and acetic acid which form during the descaling process are quite water soluble. This is very significant in that this high solubility in water will prevent the precipitation of the metal salts within the watermaker and particularly within the tube bundles of the evaporator during acidization, thus alleviating clogging of the system.

In one embodiment, the method of the present invention may be carried out in a typical 50 gallon capacity unit by a series of steps which include, first of all, shutting down the water production equipment and draining the unit which is to be treated with the descaling composition. An amount of 25 gallons of fresh or sea water, at ambient temperature such as approximately 77° to 86° F., is then added to the unit. The amount of 5 gallons of the composition of the present invention is then added and the reaction is allowed to proceed for approximately five minutes. At this time, an additional ten gallons of fresh water is added to the unit and the reaction is allowed to continue for an additional ten minutes. At this point, the heating system of the watermaker unit is activated and allowed to equilibrate at a solution temperature of about 130° F. The acidizer composition of the invention is then allowed to remain in the watermaker for an additional 20 minutes after which it is drained from the unit. The watermaker equipment is then activated and the first 10 gallons of fresh product water which has been stored is then discarded. Product water is stored after a previously determined low ionic level is attained. The amount of 5 gallons of the present composition will dissolve approximately 12 to 15 pounds of mixed phosphate-carbonate containing scale when used as described above. The upper limit of the amount of scale which may be removed is achieved with high carbonate to phosphate ratios.

Various metal samples of copper, brass, stainless steel and an alloy of 90% copper-10% nickel were tested under simulated watermaker acidization conditions of both ambient and elevated temperature conditions using the composition of the present invention. The results were found to be very favorable and data on a sample of the copper-nickel alloy material, the most popular in watermaker construction, revealed no significant pitting of exposed metal, i.e., less than 0.001% per acidization.

In the composition of the present invention as formulated and diluted eight-fold, the molarity of the hydrochloric acid is only 0.325 M–0.425 M and the total acid strength is 0.825 M–1.085 M.

It will be understood that additional components such as corrosion inhibitors, foam inhibitors and certain wetting agents may be added to a particular treating solution of the invention, although the presence of such additional components is not essential.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A composition for descaling fresh water production and storage equipment which comprises: hydrochloric acid at a concentration of about 2.6 to 3.4 M; dichloroacetic acid at a concentration of about 0.4 to 0.8 M; acetic acid at a concentration of about 3.6 to 4.5 M; about 5 to 10% by weight of a compound selected from the group consisting of isopropyl alcohol, isobutyl alcohol and esters of said isopropyl or isobutyl alcohol with hydrochloric acid, dichloroacetic acid or acetic acid, and mixtures thereof; and about 40 to 60% by weight of water.

2. The composition of claim 1 further including an acid-base indicator in an amount of about 0.00025 to 0.00035% by weight of the composition to signify neutralization of the composition during use thereof.

3. The composition of claim 1 wherein said compound is selected from the group consisting of isopropyl alcohol and isobutyl alcohol.

4. The composition of claim 1 wherein: the amount of hydrochloric acid is about 9.5 to 12.4% by weight of the composition; the amount of dichloroacetic acid is about 5.2 to 10.3% by weight of the composition; and the amount of acetic acid is about 21.6 to 27.4% by weight of the composition.

5. The composition of claim 1, further including about eight volumes of fresh or sea water for each one volume of said composition.

6. The composition of claim 2 wherein said acid-base indicator is methyl orange.

* * * * *